(12) United States Patent
Kolloch et al.

(10) Patent No.: US 9,958,050 B2
(45) Date of Patent: May 1, 2018

(54) BELT PULLEY AND GEAR NUT WITH SUCH A BELT PULLEY

(71) Applicant: TRW Automotive GmbH, Alfdorf (DE)

(72) Inventors: Robert Kolloch, Mönchengladbach (DE); Eduard Span, Köln (DE); Rico Andersch, Langenfeld (DE); Thomas Roggow, Kerpen (DE)

(73) Assignee: TRW Automotive GmbH, Alfdorf (DE)

( * ) Notice: Subject to any disclaimer, the term of this patent is extended or adjusted under 35 U.S.C. 154(b) by 60 days.

(21) Appl. No.: 14/783,164

(22) PCT Filed: Mar. 26, 2014

(86) PCT No.: PCT/EP2014/056056
§ 371 (c)(1),
(2) Date: Oct. 8, 2015

(87) PCT Pub. No.: WO2014/166742
PCT Pub. Date: Oct. 16, 2014

(65) Prior Publication Data
US 2016/0047456 A1    Feb. 18, 2016

(30) Foreign Application Priority Data

Apr. 8, 2013   (DE) .................. 10 2013 103 493

(51) Int. Cl.
*F16H 55/17*   (2006.01)
*F16H 55/48*   (2006.01)

(52) U.S. Cl.
CPC ............ *F16H 55/171* (2013.01); *F16H 55/48* (2013.01)

(58) Field of Classification Search
CPC .............................. F16H 55/17; F16H 55/171
(Continued)

(56) References Cited

U.S. PATENT DOCUMENTS 4,468,210 A * 8/1984 McCutchan, Jr. ...... F16H 55/44
                                                    474/170
4,913,689 A * 4/1990 Morishita ................ B21H 1/04
                                                    474/170
(Continued)

FOREIGN PATENT DOCUMENTS

CN    201021709 Y    2/2008
DE    102004058963 A1    6/2006
(Continued)

OTHER PUBLICATIONS

Chinese Office Action, Application No. 201480019962, dated Jan. 3, 2017.
(Continued)

*Primary Examiner* — William E Dondero
*Assistant Examiner* — Mark K Buse
(74) *Attorney, Agent, or Firm* — MacMillan, Sobanski & Todd, LLC

(57) ABSTRACT

A belt pulley for a gear mechanism, in particular for a steering gear, having a cylindrical body having an outer surface on which a toothing made of a plastic material is provided, and a fastening flange which is provided with fastening openings, is characterized in that the toothing is configured integrally with the cylindrical body.

17 Claims, 6 Drawing Sheets

(58) Field of Classification Search
USPC .................................................. 474/161, 165
See application file for complete search history.

(56) References Cited

U.S. PATENT DOCUMENTS

| | | | | |
|---|---|---|---|---|
| 5,069,654 A * | 12/1991 | Rampe | ................. | F16D 1/0805 29/892 |
| 5,878,629 A * | 3/1999 | Nagata | .................... | B62D 1/10 403/259 |
| 6,074,316 A * | 6/2000 | Murrietta, Sr. | ......... | F16H 55/12 474/95 |
| 6,089,833 A * | 7/2000 | Glanfield | .................. | F01P 5/10 417/362 |
| 6,098,494 A * | 8/2000 | Kellogg, Jr. | .......... | B60R 21/203 403/8 |
| 6,134,986 A * | 10/2000 | Durrani | .................... | B62D 1/10 403/8 |
| 6,220,970 B1 * | 4/2001 | Berger | .................... | F02B 67/00 464/180 |
| 7,850,558 B2 * | 12/2010 | Oh | .......................... | F16H 35/10 464/10 |
| 8,997,597 B2 * | 4/2015 | Rupp | .................. | B62D 5/0424 74/388 PS |
| 9,188,173 B2 * | 11/2015 | Chambonneau | ...... | F16D 41/064 |
| 9,371,901 B2 * | 6/2016 | Jung | ....................... | F16H 55/36 |
| 2003/0139240 A1 * | 7/2003 | Chen | ....................... | F16H 55/49 474/152 |
| 2006/0264286 A1 * | 11/2006 | Hodjat | .................. | F16H 55/171 474/152 |
| 2006/0264289 A1 | 11/2006 | Hodjat | | |
| 2008/0161141 A1 * | 7/2008 | Joo | .......................... | F16H 55/48 474/8 |
| 2015/0133248 A1 * | 5/2015 | Wang | .................... | F16H 55/171 474/152 |
| 2016/0003339 A1 * | 1/2016 | Roberts, III | ............ | F16H 55/06 74/446 |
| 2016/0047456 A1 | 2/2016 | Kolloch et al. | | |

FOREIGN PATENT DOCUMENTS

| | | |
|---|---|---|
| DE | 102006059946 A1 | 7/2007 |
| DE | 102007023364 A1 | 11/2008 |
| DE | 102007049114 A1 | 4/2009 |
| DE | 112007047799 A1 | 5/2009 |
| DE | 102010003105 A1 | 9/2011 |
| DE | 102013103493 A1 | 10/2014 |
| WO | 2006/003247 A1 | 1/2006 |
| WO | 2006/061104 A1 | 6/2006 |
| WO | 2008/141966 A1 | 11/2008 |
| WO | 2011/117099 A1 | 9/2011 |

OTHER PUBLICATIONS

German Search Report, Application No. 102013103493.4 dated Jul. 2, 2014.
PCT International Search Report, Application No. PCT/EP2014/056056 filed Mar. 26, 2014, dated Jul. 16, 2014.
PCT International Search Report, Application No. PCT/EP2014/056056 filed Mar. 26, 2014 (English Translation).

* cited by examiner

BELT PULLEY AND GEAR NUT WITH SUCH A BELT PULLEY

CROSS-REFERENCE TO RELATED APPLICATIONS

This application is a national stage of International Application No. PCT/EP2014/056056 filed Mar. 26, 2014, the disclosures of which are incorporated herein by reference in entirety, and which claimed priority to German Patent Application No. 10 2013 103 493.4 filed Apr. 8, 2013, the disclosures of which are incorporated herein by reference in entirety.

BACKGROUND OF THE INVENTION

The invention relates to a belt pulley for a gear mechanism, in particular for a steering gear, including a cylindrical body having an outer surface on which a toothing made of a plastic material is provided, and a fastening flange which is provided with fastening openings. The invention further relates to an assembly including a gear nut and such a belt pulley.

A belt pulley of the type initially mentioned is known from DE 10 2004 058 963 A1. It is coupled to a recirculating ball nut so as to prevent relative rotation and relative displacement, the recirculating ball nut having, in turn, a screw coupled thereto. A toothed belt can engage with the toothing on the outer surface of the belt pulley, the toothed belt running over a further belt pulley which, in turn, is coupled to a drive motor. The gear mechanism formed in this way is employed in particular in electromechanically operated rack-and-pinion steering systems in motor vehicles.

In this known belt pulley, the cylindrical body is made from sheet metal, and the toothing is configured as a plastic part on the outer surface of the cylindrical body. To ensure a connection with the ball nut in a manner so as to prevent relative rotation, the fastening flange may be provided with a plurality of openings through which fastening elements extend which engage into openings on the periphery of the recirculating ball nut.

A similar structure is disclosed in DE 10 2006 059 946 A1. Here, too, a cylindrical body is used which has a toothing applied on its outside. Light metal alloys or fiber composite materials may be used for the base body. The toothing is made from a thermosetting plastic. This is intended to generally achieve a weight saving.

Also already known from the prior art are belt pulleys which are made entirely from a plastic material. Examples thereof are found in DE 10 2007 049 114 A1 and WO 2011/117099 A1. But with these belt pulleys it is no longer possible to transmit the torques between the belt pulley and the gear nut via a fastening flange. Rather, shaft-hub connections are employed which make use of a tongue and groove or of spiral pins.

BRIEF SUMMARY OF THE INVENTION

A feature of the invention consists in providing a belt pulley of the type mentioned at the outset which distinguishes itself by a further reduction in weight and thus a lower inertial mass, and which can be produced with little effort.

To achieve this feature, provision is made according to the invention that the toothing is configured integrally with the cylindrical body. The invention is based on the finding that in the case of a use of a fastening flange on the belt pulley, it is possible to transmit the torques that occur, even if the cylindrical body and the toothing are made from identical materials. It is therefore no longer necessary to produce a composite part. This results in a very low overall weight, accompanied by low manufacturing expense.

Preferably, provision is made that the belt pulley consists of a plastic material, in particular of a phenolic resin. This material distinguishes itself by a good tradeoff between costs, processability and mechanical properties.

Preferably, provision is made that the fastening flange is arranged axially next to the toothing. This makes sure that the fastening openings are easily accessible.

According to a further configuration of the invention, provision is made that the fastening flange projects beyond the toothing in the axial direction. This allows the fastening flange to be employed as a stop disk for the toothed belt.

According to a preferred embodiment of the invention, provision is made that the fastening flange is provided with a reinforcement in the region of the fastening openings. The reinforcement ensures that the fastening elements that extend through the fastening openings, such as bolts or pins, for example, will not exert local loads on the material of the fastening flange that are so high that a creeping will occur there.

In one embodiment, the reinforcement may be configured as a washer. This results in low costs.

According to an alternative configuration, provision is made that the reinforcement is configured as a continuously surrounding reinforcing ring. This reduces the manufacturing expense.

The flange may have projections provided thereon which protrude toward the reinforcement and which serve as a mounting aid for the reinforcement. The reinforcement has openings provided thereon which correspond to the projections and into which the projections can engage when positioned properly.

The openings and the projections preferably have the same distance from the center axis of the cylindrical body as the fastening openings. This has the advantage that when positioned appropriately, the openings can also be used for fastening means which are mounted in the fastening openings for fastening the washer.

Provision may be made that the reinforcement is firmly connected with the fastening flange. This facilitates the assembly since it need not be ensured that the reinforcement is in the proper position when the fastening elements are fitted.

According to one configuration, provision may be made that the reinforcement is molded in the fastening flange. Any separate steps for mounting the reinforcement to the belt pulley are thus not necessary.

Preferably, provision is made that the reinforcement is exposed on the front face of the fastening flange. This results in a reduction in the manufacturing expense in particular when the reinforcement is molded in the belt pulley since, in this case, it can be held in the injection mold with little effort.

According to one configuration of the invention, provision is made that the belt pulley is in the form of a doubled-walled hollow body and the reinforcement closes the hollow body on a front face. In this configuration, the reinforcement, which is preferably made of metal, contributes to the stability of the belt pulley since it connects the two walls of the belt pulley with each other in the region of the fastening flange.

To achieve the aforesaid object, further provision is made for an assembly including a gear nut which includes a mounting flange that is provided with a plurality of mounting openings, and a belt pulley of the type mentioned above.

For fastening the belt pulley to the gear nut, bolts or detent studs may be provided which extend through the fastening openings in the fastening flange of the belt pulley and the mounting openings in the mounting flange of the gear nut.

Other advantages of this invention will become apparent to those skilled in the art from the following detailed description of the preferred embodiments, when read in light of the accompanying drawings.

DETAILED DESCRIPTION OF THE INVENTION

Figure 1:
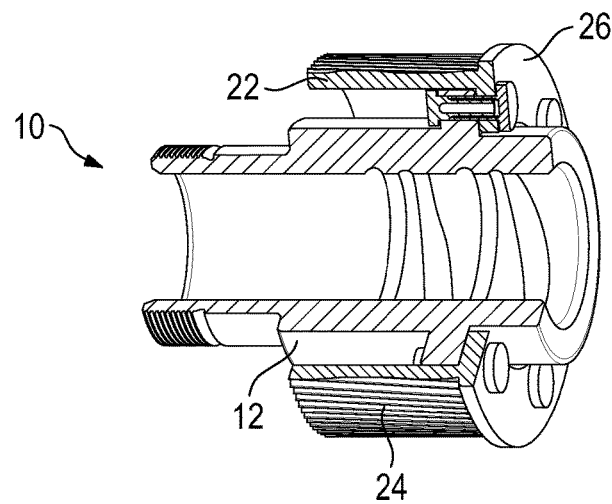
FIG. 1 shows a perspective sectional view of an assembly according to the invention.
Figure 2:
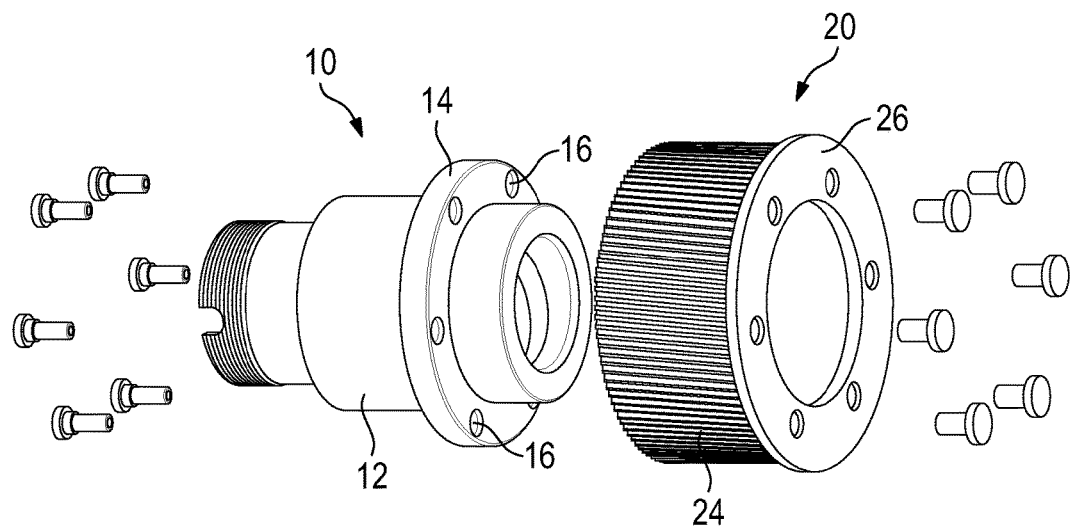
FIG. 2 shows an exploded view of the component parts of the assembly of FIG. 1.
Figure 3:
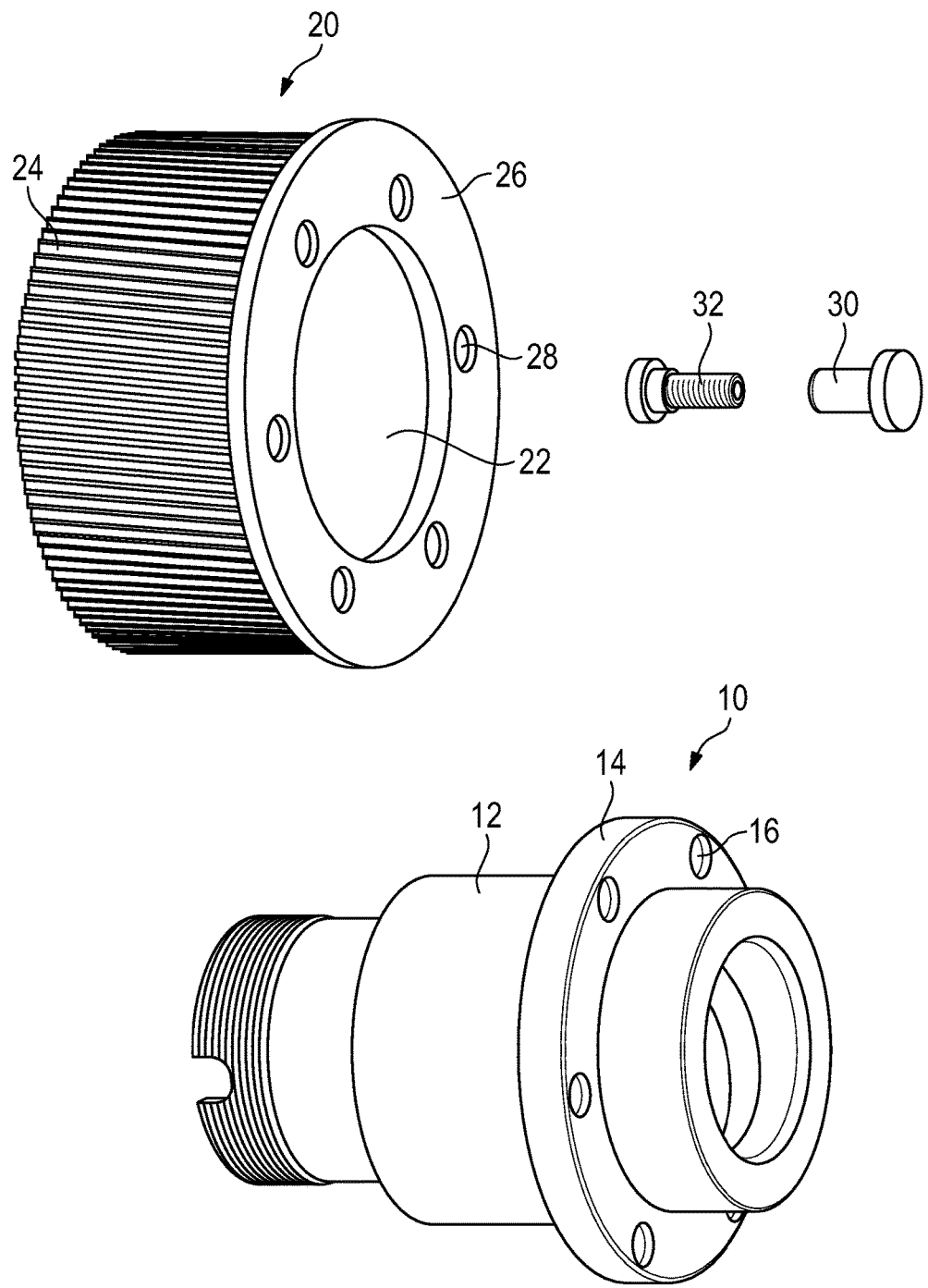
FIG. 3 shows, on a larger scale, the belt pulley, the gear nut, and a fastening element of the assembly of FIG. 1.

FIGS. 1 to 3 show a gear nut 10 which may be part of a steering gear and is configured as a recirculating ball nut, for example. It includes a generally cylindrical base body 12 which is provided with a circumferential mounting flange 14. The mounting flange 14 has a plurality of mounting openings provided therein. In this exemplary embodiment, six mounting openings are used, which are evenly spaced from one another along the mounting flange. The gear nut is preferably made of metal.

A belt pulley 20 is provided which is made in one piece from a plastic material, in particular from a phenolic resin. The belt pulley 20 includes a cylindrical body 22 having an outer surface with a toothing 24 provided thereon. Provided on a front face of the cylindrical body 22 is a fastening flange 26 which slightly protrudes radially outwards beyond the toothing 24 and distinctly projects radially inwards beyond the inner surface of the cylindrical body 22. Provided in the region of the fastening flange 26 located within the cylindrical body 22 is a plurality of fastening openings 28 which, in terms of orientation and number, correspond to the mounting openings 16 in the mounting flange 14 of the gear nut 10. The inside diameter of the fastening flange 26 is slightly larger than the outside diameter of the gear nut 10 axially next to the mounting flange 14.

When the belt pulley 20 is mounted on the gear nut 10, the cylindrical body 22 of the belt pulley 20 concentrically encloses part of the gear nut 10 (see in particular FIG. 1). To fasten the belt pulley 20 to the gear nut 10, a plurality of fastening elements is used which here are formed of detent studs 30 into each of which a detent pin 32 is inserted. In this way, a connection preventing relative rotation is formed between the belt pulley 20 and the gear nut 10.

Figure 4:
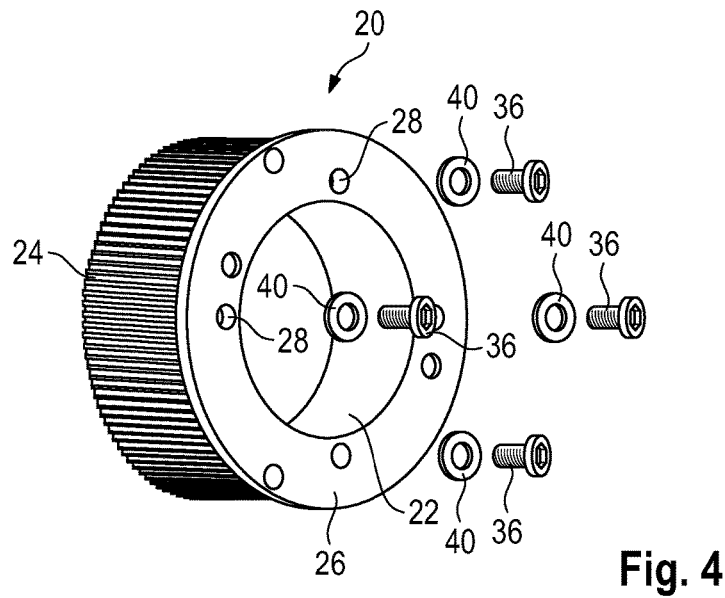
FIG. 4 shows a perspective view of a belt pulley according to a second embodiment of the invention.

FIG. 4 shows a second embodiment of the belt pulley 20. The difference from the first embodiment resides in that for fastening the belt pulley 20 to the gear nut 10, use is made of a plurality of fastening bolts 36 which extend through the fastening openings 28 in the fastening flange 26. Nuts are screwed onto the fastening bolts 36, the nuts being arranged in the cylindrical gap between the outer surface of the gear nut 10 and the inner surface of the cylindrical body 22.

In order to ensure that no creeping of the material of the belt pulley 20 will occur in the area where the bolt heads rest against the fastening flange 26, provision is made for a plurality of reinforcements 40 here, which are in the form of washers. They increase the effective supporting surface between the bolt head and the fastening flange, causing the bearing stress to be reduced there.

Figure 5:
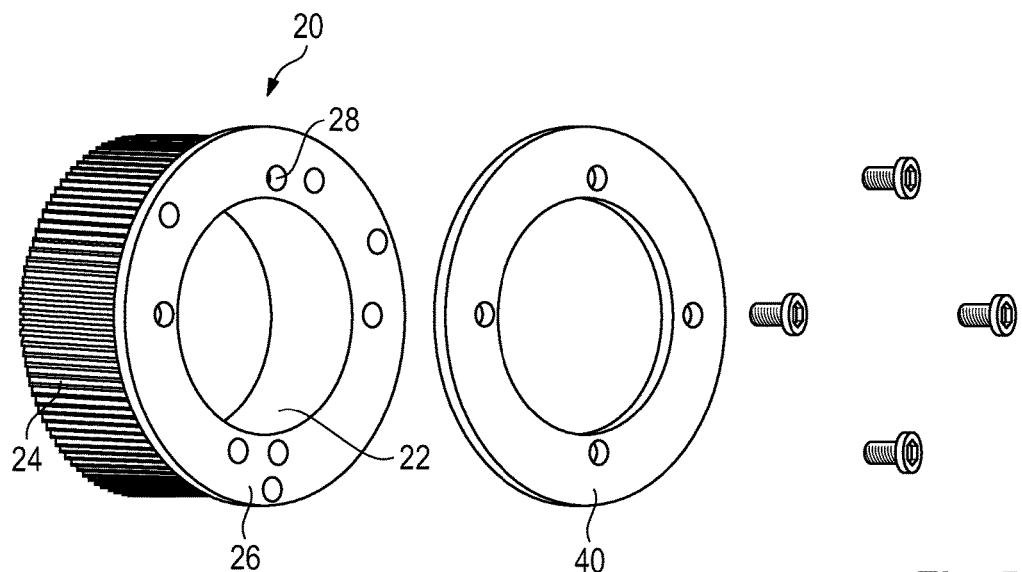
FIG. 5 shows a perspective view of a belt pulley according to a third embodiment of the invention.

FIG. 5 shows a third embodiment. It differs from the second embodiment with regard to the configuration of the reinforcement 40. In the third embodiment, the reinforcement 40 is formed as a continuously surrounding ring which, more particularly, may be made of metal. The dimensions of the ring essentially correspond to the dimensions of the fastening flange 26. The bolt heads of the fastening bolts 36 rest against the surface of the ring facing away from the fastening flange 26.

Figure 6:
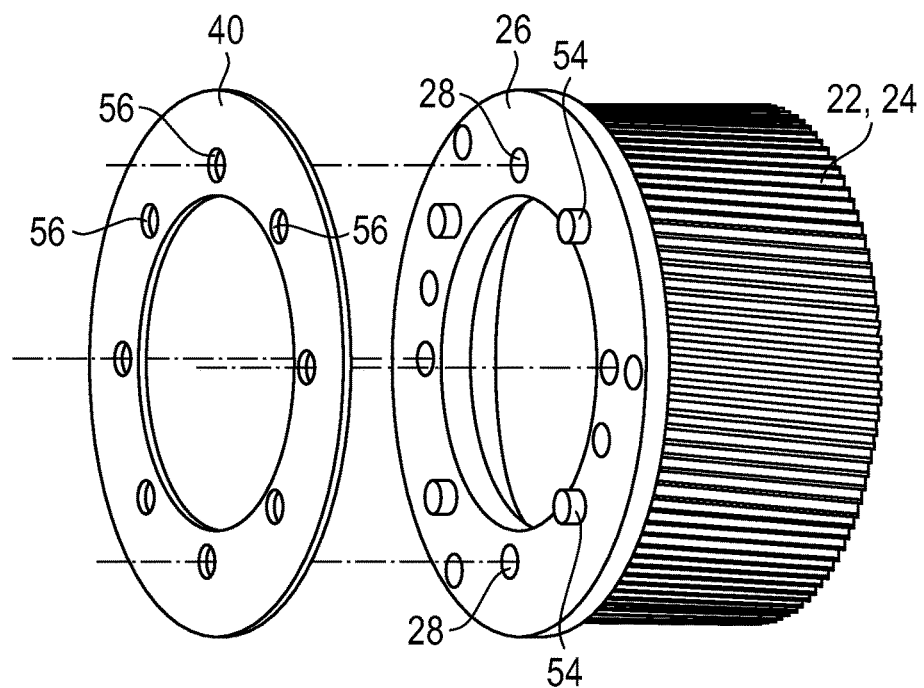
FIG. 6 shows a perspective exploded view of a belt pulley according to a fourth embodiment of the invention.
Figure 7:
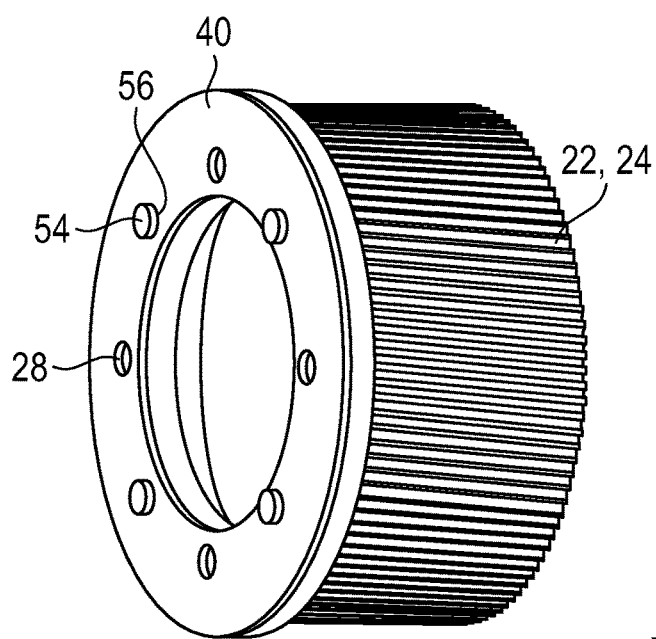
FIG. 7 shows a perspective view of the belt pulley of FIG. 8 in the assembled state.

FIGS. 6 and 7 show a fourth embodiment. It differs from the third embodiment in that the flange 26 has projections 54 provided thereon which protrude toward the reinforcement 40. The reinforcement 40 has openings 56 provided thereon which correspond to the projections 54. The projections 54 and the openings 56 are arranged on the same radius about the center axis of the body 22 as the fastening openings 28, that is, they have the same distance from the center axis as the fastening openings.

The openings 56, in combination with the projections 54, make it easier to position the reinforcement 40 on the flange 26 (FIG. 7). Since the openings 56 have the same radius as the fastening openings 28, the fastening bolts 36 can be guided into the fastening openings 28 through additionally provided openings 56. That is, the position and number of the openings 56 is selected such that the fastening openings 28 are kept free and/or additional openings 56 correspond to the fastening openings 28.

Figure 8:
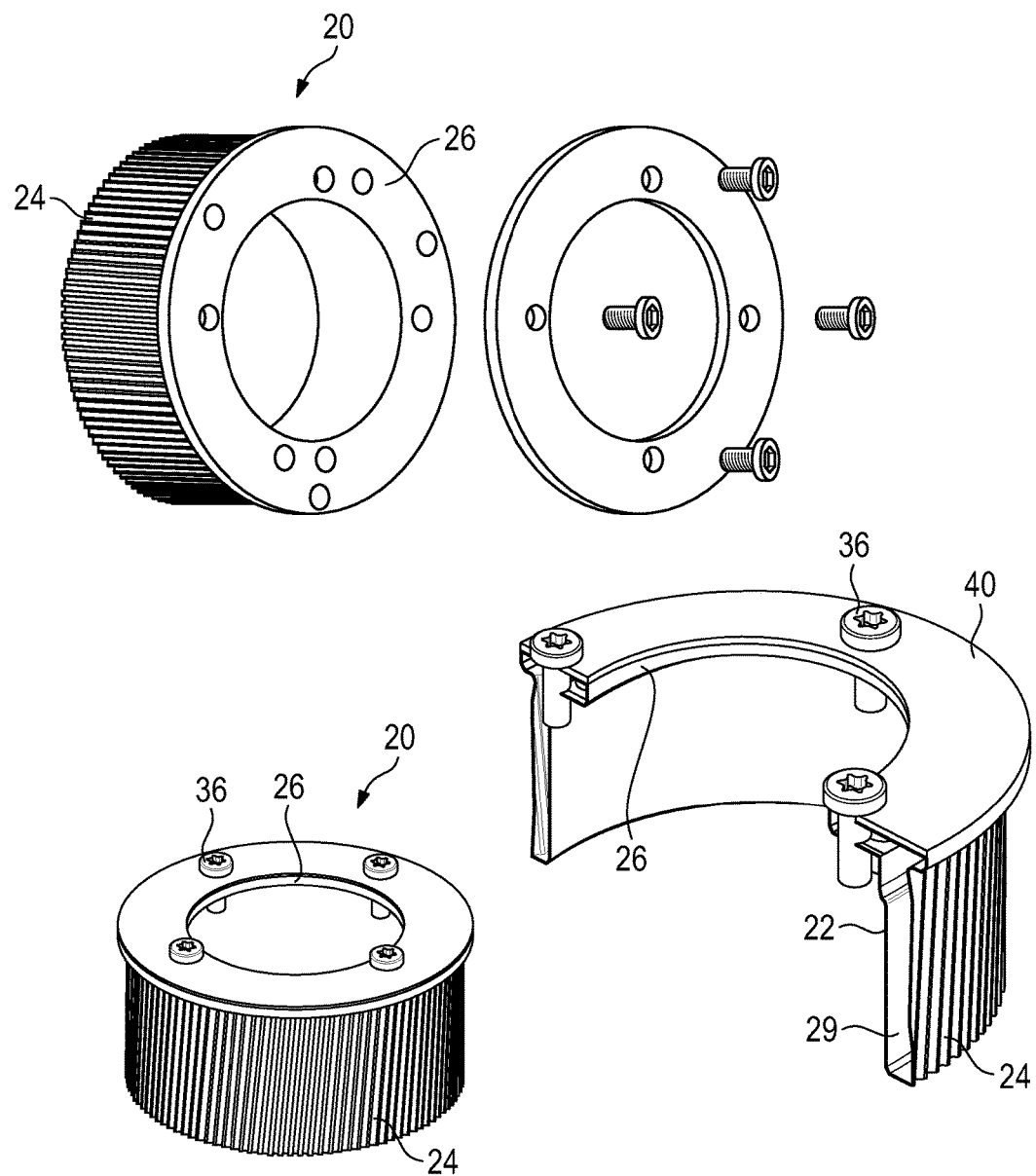
FIG. 8 shows a perspective exploded view, a perspective general view, and a perspective sectional view of a belt pulley according to a fifth embodiment of the invention.

FIG. 8 shows a fifth embodiment of the belt pulley 20. The difference from the third embodiment shown in FIG. 5 consists in that in the fifth embodiment, the belt pulley 20 is configured as a double-walled hollow body. Accordingly, a cavity 29 is provided between the inner wall of the cylindrical body 22 and the outer wall having the toothing 24 formed thereon. This cavity is open on the side of the fastening flange 26, so that the body 22 can be removed from the mold without any difficulty. The reinforcement 40 is arranged here on the side of the fastening flange 26 and, similar to the reinforcement 40 in the third embodiment, it is configured as a comparatively wide reinforcing ring, preferably made of metal. This stabilizes the hollow body as a whole.

Figure 9:
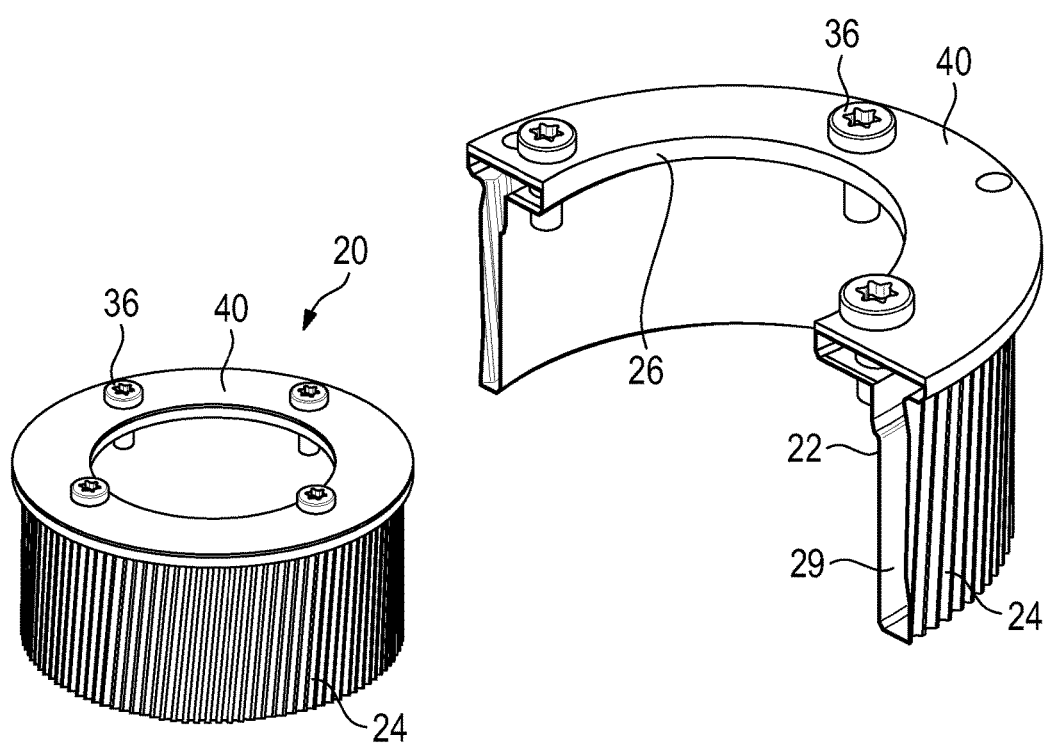
FIG. 9 shows a perspective view and a perspective sectional view of a belt pulley according to a sixth embodiment of the invention.

FIG. 9 shows a sixth embodiment. It differs from the fifth embodiment only in that the reinforcement 40 is firmly connected with the belt pulley 20, rather than being placed on it from outside, as is the case in the fifth embodiment. In order to connect the reinforcement 40 firmly with the belt pulley, the belt pulley is provided with a respective protruding edge 50 and 52, respectively, on the inner and outer sides in the area of its fastening flange, the edges 50 and 52 resting against the ring-shaped inner and outer surfaces, respectively, of the reinforcing ring 40. Here, the reinforcing ring 40 is preferably molded into the fastening flange 26 during the manufacture of the belt pulley 20.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A belt pulley for a steering gear comprising: a cylindrical body having an outer surface on which a toothing made of a plastic material is provided, and a fastening flange which is provided with fastening openings, wherein the toothing is configured integrally with the cylindrical body, wherein the fastening flange is provided with a reinforcement in the region of the fastening openings, wherein the reinforcement is configured as a continuously surrounding reinforcing ring, wherein the flange has projections provided thereon which protrude toward the reinforcing ring, and wherein the reinforcing ring has openings provided thereon which correspond to the projections.

2. The belt pulley according to claim 1, wherein the belt pulley consists of a plastic material.

3. The belt pulley according to claim 1, wherein the fastening flange is arranged axially next to the toothing.

4. The belt pulley according to claim 3, wherein the fastening flange projects beyond the toothing in an axial direction.

5. The belt pulley according to claim 1, wherein the reinforcement is configured as a washer.

6. The belt pulley according to claim 5, wherein the openings and the projections have the same distance from a center axis of the cylindrical body as the fastening openings.

7. The belt pulley according to claim 1, wherein the reinforcement is firmly connected with the fastening flange.

8. The belt pulley according to claim 1, wherein the reinforcement is exposed on the front face of the fastening flange, wherein the front face faces away from the toothing.

9. An assembly comprising a gear nut which includes a mounting flange that is provided with a plurality of mounting openings, and comprising a belt pulley for a steering gear comprising: a cylindrical body having an outer surface on which a toothing made of a plastic material is provided, and a fastening flange which is provided with fastening openings, wherein the toothing is configured integrally with the cylindrical body.

10. The assembly according to claim 9, wherein the fastening flange is arranged axially next to the toothing.

11. The assembly according to claim 9, wherein the fastening flange projects beyond the toothing in an axial direction.

12. The assembly according to claim 9, wherein the fastening flange is provided with a reinforcement in the region of the fastening openings.

13. The assembly according to claim 12, wherein the reinforcement is configured as a washer.

14. The assembly according to claim 12, wherein the reinforcement is configured as a continuously surrounding reinforcing ring.

15. The assembly according to claim 13, wherein the flange has projections provided thereon which protrude toward the reinforcing ring, and wherein the reinforcing ring has openings provided thereon which correspond to the projections.

16. The assembly according to claim 15, wherein the openings and the projections have the same distance from a center axis of the cylindrical body as the fastening openings.

17. The assembly according to claim 9, wherein the reinforcement is exposed on the front face of the fastening flange, wherein the front face faces away from the toothing.

* * * * *